(12) United States Patent
Negri et al.

(10) Patent No.: US 10,987,690 B2
(45) Date of Patent: Apr. 27, 2021

(54) MANUALLY-OPERATED PAINT SPRAY GUN

(71) Applicant: ANEST IWATA Strategic Center S.r.l, Cardano al Campo (IT)

(72) Inventors: Marco Negri, Cermenate (IT); Roberto De Gregori, Mornago (IT)

(73) Assignee: ANEST IWATA STRATEGIC CENTER S.R.L, Cardano al Campo (IT)

( * ) Notice: Subject to any disclaimer, the term of this patent is extended or adjusted under 35 U.S.C. 154(b) by 199 days.

(21) Appl. No.: 16/020,515

(22) Filed: Jun. 27, 2018

(65) Prior Publication Data

US 2019/0001359 A1 Jan. 3, 2019

(30) Foreign Application Priority Data

Jun. 28, 2017 (IT) .................. 102017000072417

(51) Int. Cl.
| | | |
|---|---|---|
| B05B 12/00 | (2018.01) | |
| G01L 19/00 | (2006.01) | |
| B05B 15/63 | (2018.01) | |
| B05B 7/12 | (2006.01) | |
| B05B 7/02 | (2006.01) | |
| B05B 7/24 | (2006.01) | |
| B05B 15/50 | (2018.01) | |
| G01L 9/06 | (2006.01) | |

(52) U.S. Cl.
CPC ............ B05B 12/008 (2013.01); B05B 7/129 (2013.01); B05B 15/63 (2018.02); G01L 19/0007 (2013.01); B05B 7/02 (2013.01); B05B 7/2478 (2013.01); B05B 15/50 (2018.02); G01L 9/06 (2013.01)

(58) Field of Classification Search
CPC ....... B05B 12/008; B05B 15/63; B05B 7/129; B05B 15/50; B05B 7/02; B05B 7/2478; G01L 19/0007; G01L 9/06
USPC ............................................ 239/71, 74, 526
See application file for complete search history.

(56) References Cited

U.S. PATENT DOCUMENTS 7,422,164 B2 * 9/2008 Matsumoto ............... B05B 7/02
239/290
2010/0163649 A1 7/2010 Bass et al.

FOREIGN PATENT DOCUMENTS

| EP | 1247586 A1 | 11/2001 |
| EP | 1277519 A1 | 5/2002 |
| EP | 1477232 A1 | 1/2003 |
| EP | 1375013 A3 | 4/2003 |

(Continued)

OTHER PUBLICATIONS

Search Report for corresponding Italian Application No. IT 201700072417 completed on Feb. 22, 2018.

*Primary Examiner* — Christopher S Kim
(74) *Attorney, Agent, or Firm* — Heslin Rothenberg Farley & Mesiti P.C.; Victor A. Cardona, Esq.

(57) ABSTRACT

A manually-operated paint spray gun includes a body having a nozzle for atomizing paint to be sprayed and a handle forming a handgrip and provided with a connector for the inflow of compressed air to be supplied to the nozzle, wherein the handle of the gun has a compressed air regulator operatively associated to which is a pressure sensor at least part of which is arranged in a removable portion of the handle forming a substantial part of the dorsal area of the handgrip and is separated from the inflow connector.

12 Claims, 10 Drawing Sheets

(56) References Cited

FOREIGN PATENT DOCUMENTS

| EP | 2918347 A1 | 3/2015 |
|---|---|---|
| WO | 9116610 | 10/1991 |
| WO | 2005082544 A1 | 9/2005 |
| WO | 2010127766 A2 | 11/2010 |
| WO | 2012126963 A2 | 9/2012 |
| WO | 2014006593 A1 | 1/2014 |

* cited by examiner

MANUALLY-OPERATED PAINT SPRAY GUN

CROSS-REFERENCE TO RELATED APPLICATIONS

This application claims priority to Italian Patent Application No. 102017000072417 filed on Jun. 28, 2017, the entire disclosure of which is incorporated herein by reference.

FIELD OF THE INVENTION

The present invention generally regards manually operated paint spray guns, comprising a body having a nozzle for atomising paint to be sprayed and a handle forming a handgrip and provided with a connector for the inflow of compressed air to be supplied to the atomiser nozzle. The handle is typically provided with a compressed air regulator associated to which is a pressure gauge or pressure sensor for measuring the set pressure.

In particular, the invention regards manually-operated paint spray guns thus made, wherein the pressure gauge is of the digital type and has at least one part that can be separated from the gun so as to enable the removal thereof when the latter is subjected to periodical cleaning and washing operations using solvents.

STATE OF THE ART

Documents EP-1247586 and WO-2014/006593 describe manually-operated paint spray guns of the aforementioned type in which the entire handle with the pressure gauge, of the analogue or digital type, can be separated from the body of the gun.

In the case of documents EP-1477232 and EP-2918347, the pressure gauge is applied in a separable manner to the base of the handle, at the connector for the inflow of the compressed air.

In particular EP-1477232 describes a spray gun provided with a module that can be removed from the handle carrying the digital pressure gauge. This removable module consists of a body which forms the terminal part of the gun handle, i.e. the portion in which there is provided for the inflow connector for connecting the gun to a compressed air supply duct. Furthermore, also the compressed air duct connected to the tubular connector is part of the removable module which, thus, must be further provided with a fitting coupling portion with a gasket relative to the part of the duct provided in the gun handle. This solution does not allow a comfortable and easy removal of the module containing the pressure gauge, and the gun cannot be used without such module.

Even in the case of document EP-1277519, the pressure gauge is screwed into an enlarged front/lower portion of the handle, and according to document EP-2427275 the pressure gauge is applied in a removable fashion to a rear support plate of the gun body.

According to document EP-0526525, the pressure gauge is connected in a demountable fashion to the gun body by means of a threaded or bayonet coupling, and in the case of documents EP-1375013 and EP-1715957, the pressure gauge can be applied as a retrofit to the gun body or beneath the handle thereof.

All these prior art solutions are relatively complex and, in some cases, they negatively affect the manual grip on the gun to the detriment of the handling thereof when painting.

SUMMARY OF THE INVENTION

The object of the present invention is to provide a manually-operated paint spray gun of the type defined at the introduction in which the pressure gauge, of digital type, is configured in a manner such not to alter the configuration of the handle both from an ergonomic point of view and from an aesthetic point of view, and that is also fully or partly easy and quick to disassemble and reassemble.

According to the invention, this object is primarily attained due to the fact that the at least one separable part of the pressure gauge is arranged in a removable portion of the handle which forms a substantial part of the dorsal area of the handgrip and is separated from the compressed air inflow connector.

The term "substantial portion of the dorsal area of the handgrip" is used to indicate, in the description and in the claims that follow, an integral part of the handgrip having shape and dimensions such to adhere, in use, substantially to the entire palm of the hand of the user and whose absence would make it complicated, if not impossible, to grasp the gun in a normal manner for actuation thereof.

Thanks to this characteristic, the gun according to the invention is capable of enabling a comfortable and easy removal of the pressure gauge to enable the periodical washing of the entire gun, handle included. A further advantageous aspect of the invention lies in the fact that the removal of the removable portion of the handle does not jeopardise the operation of the gun in that, given that the inflow connector is integrally joined to the gun and it is thus independent from the removable portion, the gun could operate even without such portion which could be replaced, for example, by a special insert.

Such removable portion of the handle preferably consists of a module configured to enable connection and disconnection relative to the handle through an angular motion. A mechanical locking obtained by means of forced coupling surfaces between the module and the handle, as well as possible magnetic locking between the module and the handle, is conveniently associated to this angular motion.

According to a further distinctive characteristic of the invention, provided for is a safety stop for the aforementioned removable portion of the handle, the stop being activated by the compressed air supplied to the handle through the relative inflow connector. Such stop conveniently consists in at least one sliding pin, displaceable with respect to the aforementioned module between an inoperative retracted position, in the absence of compressed air in the handle, and an operative extracted position, in the presence of compressed air in the handle, in which it is engaged in a seat of such handle so as to lock and thus hinder the angular motion of the module.

In a first embodiment of the invention, the digital pressure gauge consists of an electronic transducer with a pressure indicator entirely housed in said removable portion of the handle, and it is thus entirely removable from the gun.

In a second embodiment of the invention, the digital pressure gauge comprises a pressure sensor conveniently of the piezoresistive type housed in the handle, and a pressure indicator housed in said removable portion of the handle and that can be electrically connected with said pressure sensor when said removable portion is applied to the handle.

BRIEF DESCRIPTION OF THE DRAWINGS

The invention will now be described in detail with reference to the attached drawings, provided purely by way of non-limiting example, wherein.

DETAILED DESCRIPTION OF THE INVENTION

Figure 1:
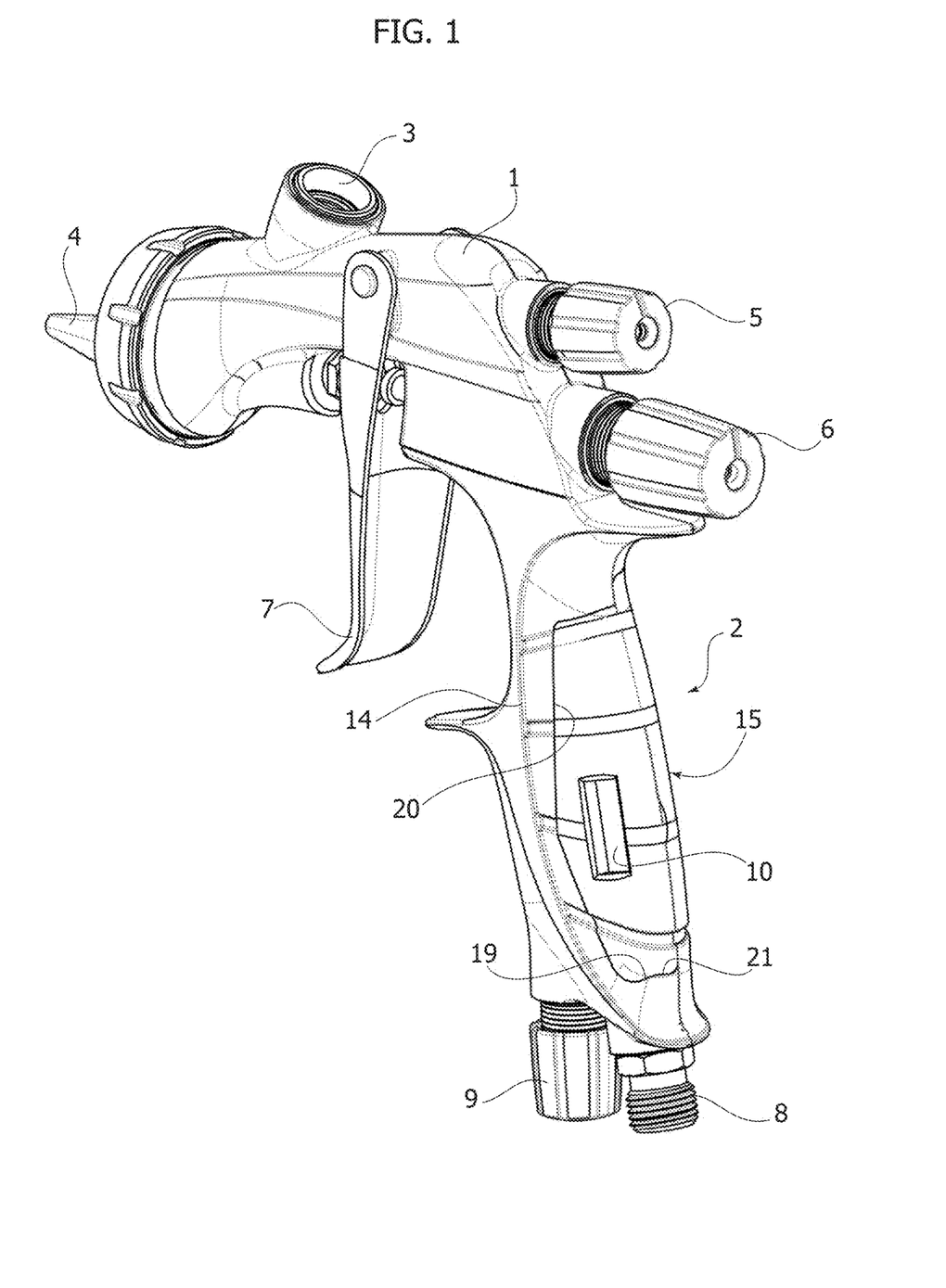
FIG. 1 is a schematic perspective view of a manually-operated paint spray gun according to an embodiment of the invention, wherein the handle is represented with the relative pressure gauge applied to the handle.
Figure 2:
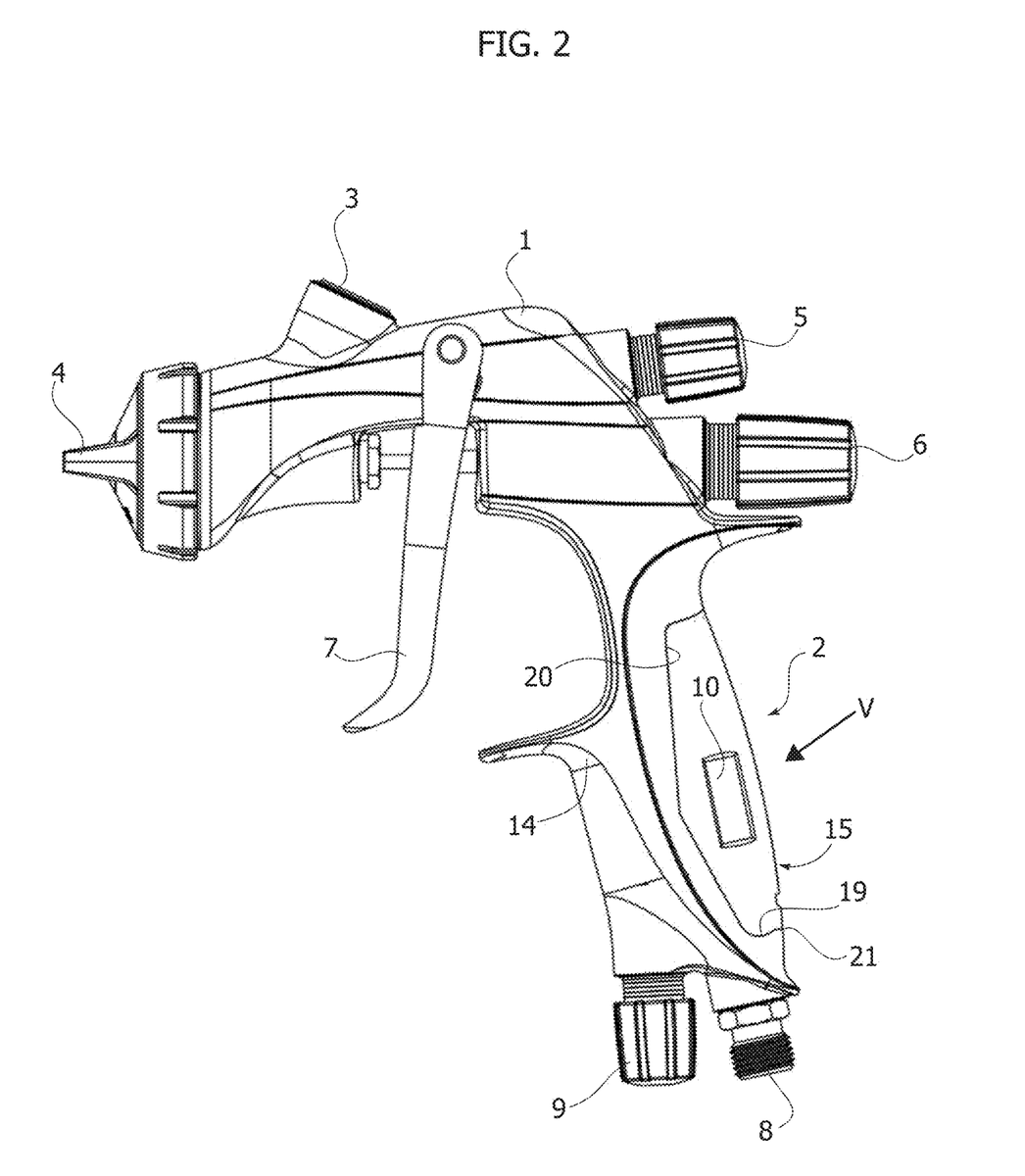
FIG. 2 is a lateral elevational view of FIG. 1.

Initially referring to FIGS. 1 and 2, a manually-operated paint spray gun according to the invention essentially comprises a body 1 and a handgrip 2 for handling the gun.

In an entirely conventional fashion, the body 1 can be provided with an inlet 3 for the removable application of a container, not illustrated, containing the paint to be sprayed which—in the operation—is supplied to an atomiser nozzle 4 to which there are operatively associated, in an equally known manner, a first and a second manual regulator 5, 6 and a trigger 7.

The handle 2 is provided—at the bottom part—with a tubular inflow connector 8 for connecting the gun to a flexible compressed air supply pipe, in a known manner too. Such inflow connector is permanently integrally joined to the base of the handle 2.

A manually actuatable pressure regulator for regulating the pressure of the air which, coming from the connector 8, is supplied to the body 1 and then dispensed, by actuating the trigger 7, to the atomiser nozzle 4, is indicated with 9.

Figure 8:
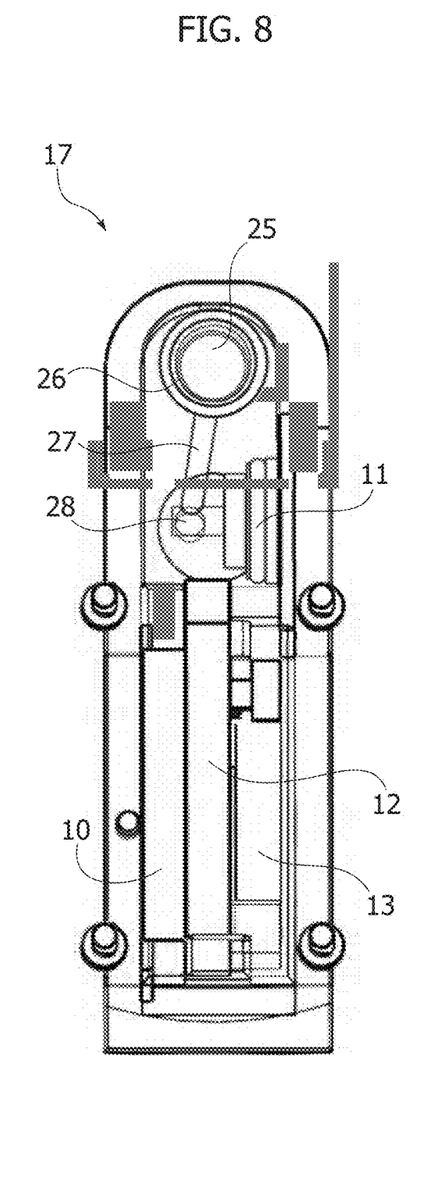
FIG. 8 is a front elevational and partly sectional view of the module of FIG. 6.
Figure 9:
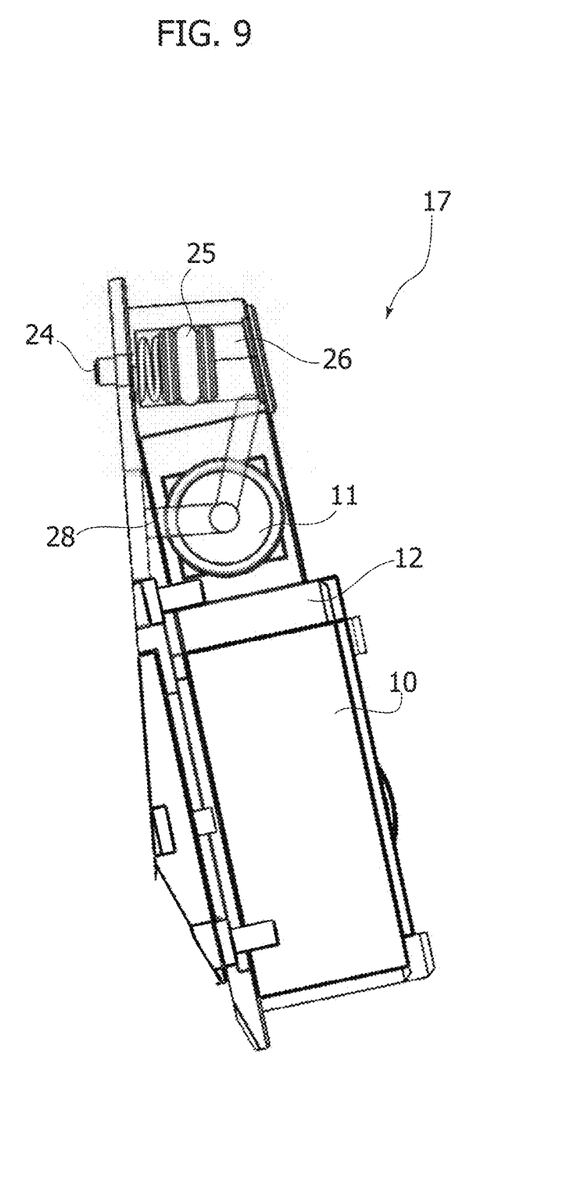
FIG. 9 is a lateral elevational and partly sectional view of the module of FIG. 6.
Figure 10:
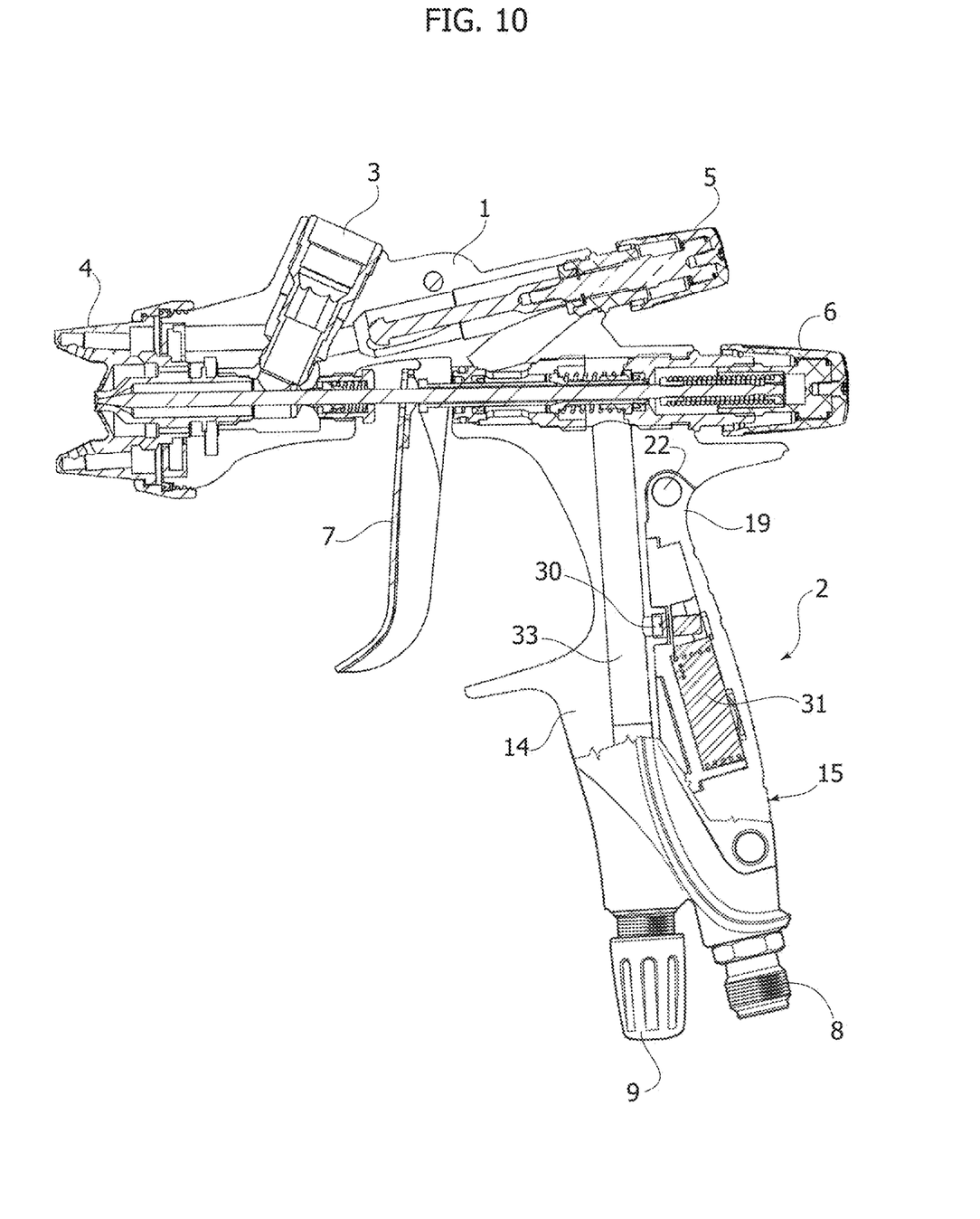
FIG. 10 is a partly vertical sectional view of a variant of the gun according to the invention.
Figure 11:
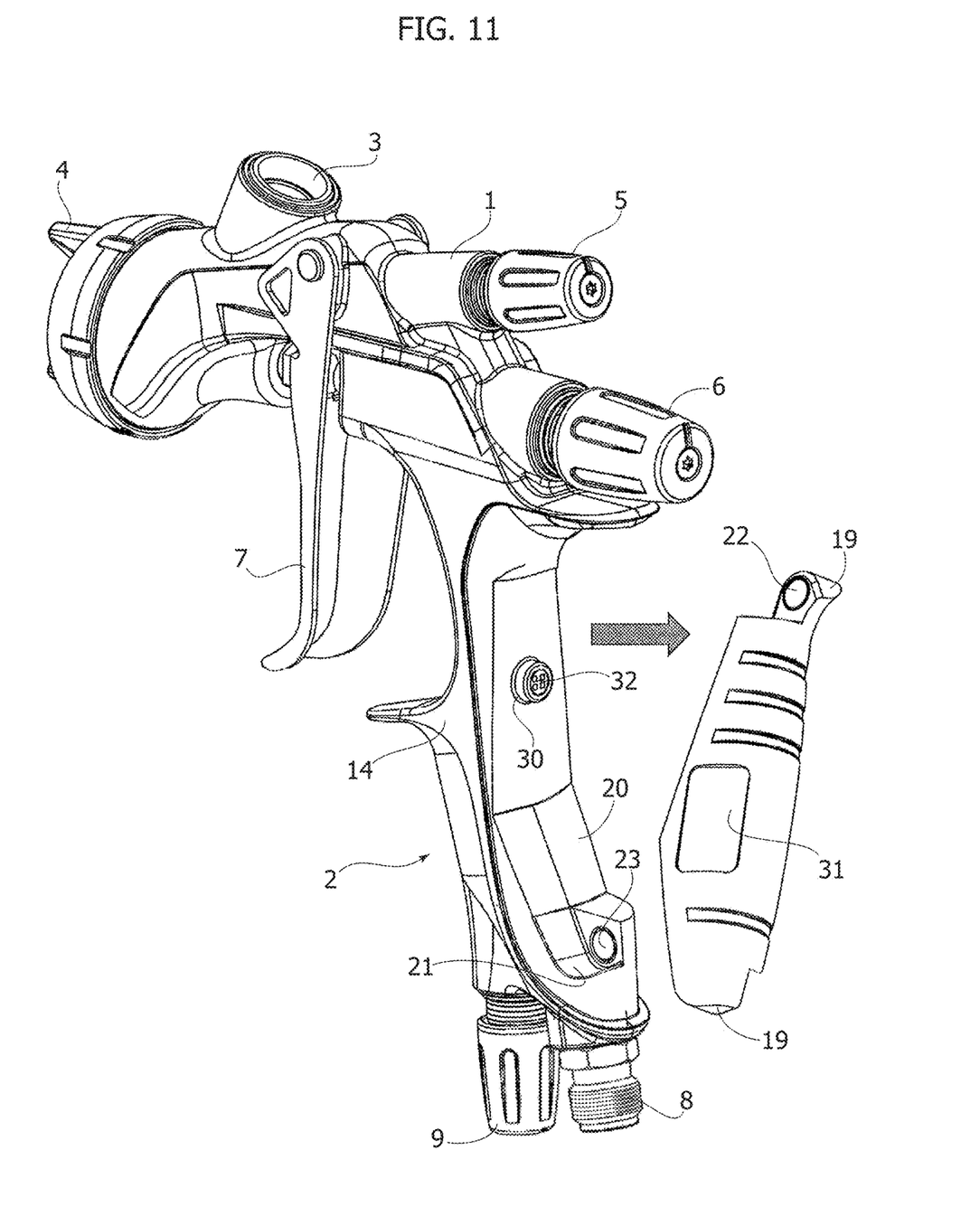
FIG. 11 is a perspective view, analogous to FIG. 4, of the variant of the gun according to FIG. 10.
Figure 12:
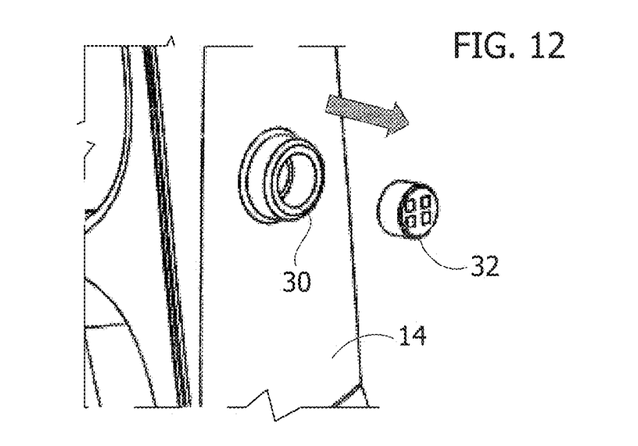
FIG. 12 shows an enlarged and exploded detail of FIG. 11.
Figure 13:
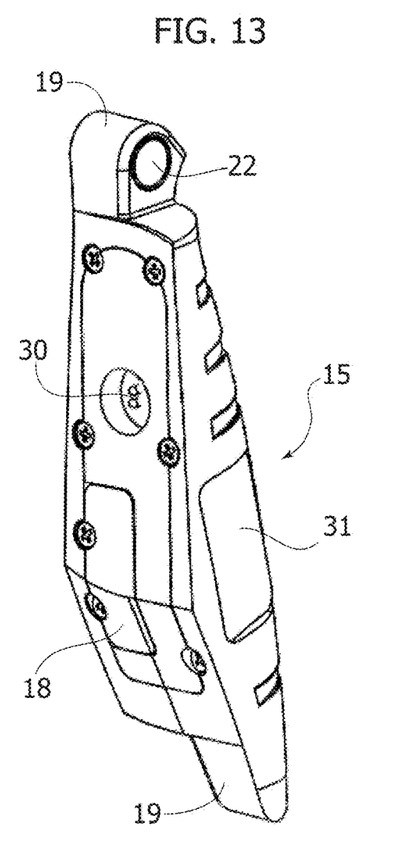
FIG. 13 is an exploded perspective view of the module of the variant of FIG. 10.
Figure 14:
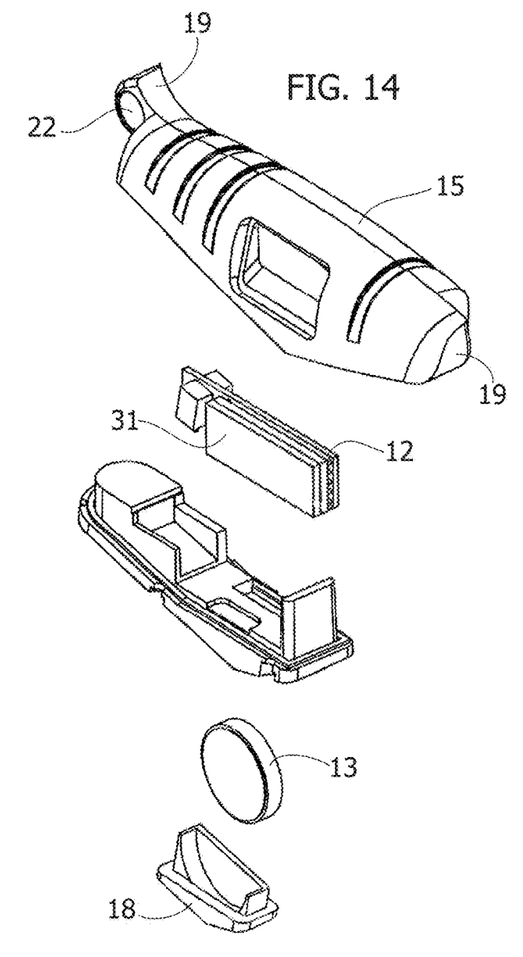
FIG. 14 is an exploded perspective view of the module of FIG. 12, seen from another angle.

The amount of air pressure established through the regulator 9 is detected by a digital pressure gauge consisting of an electronic pressure transducer in this case, schematically indicated with 11 in FIGS. 8 and 9 with the relative electronic circuit 12 power-supplied by a battery 13. The value of the detected pressure is shown on a display 10, typically of the liquid crystals type, operatively connected to the transducer 11 and exposed and thus visible on one side of the handle 2.

The entire pressure gauge is arranged in a removable portion or module (15) of the handle (2) forming an integral part of the handgrip 14. The term "integral part" is used to indicate that the removable portion 15 of the handle 2 in which the pressure gauge is arranged neither modifies nor alters the handgrip 14 from a functional, ergonomic and aesthetic point of view.

According to the peculiar characteristic of the invention, the removable portion or module 15 forms a substantial part of the dorsal area of the handgrip 14 and it is separated from the compressed air inflow connector 8.

As previously mentioned, the term "substantial portion of the dorsal area of the handgrip" is used to indicate that the removable portion 15 of the handgrip 2 has shape and dimensions such to entirely adhere to the palm of the hand of the user and whose absence would make it complicated, if not impossible, to grasp the gun in a normal manner for actuation thereof. In the case of the illustrated example, the removable portion 15 extends almost over the entire length of the handle 2 and over most part of the width thereof.

Figures 5, 6:
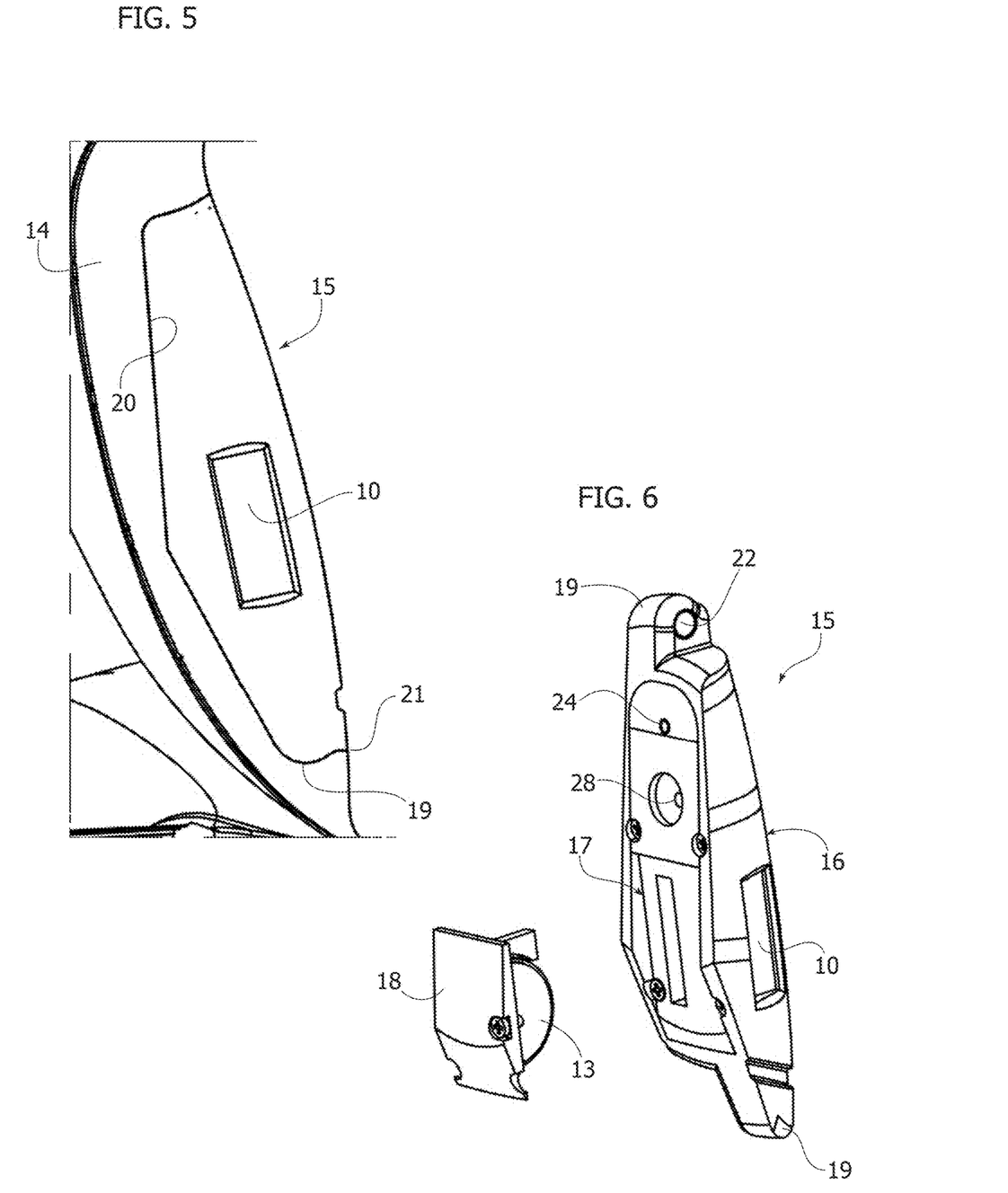
FIG. 5 shows—in larger scale—the detail indicated by the arrow V in FIG. 2.
FIG. 6 is an exploded perspective view of the module carrying the pressure gauge.
Figure 7:
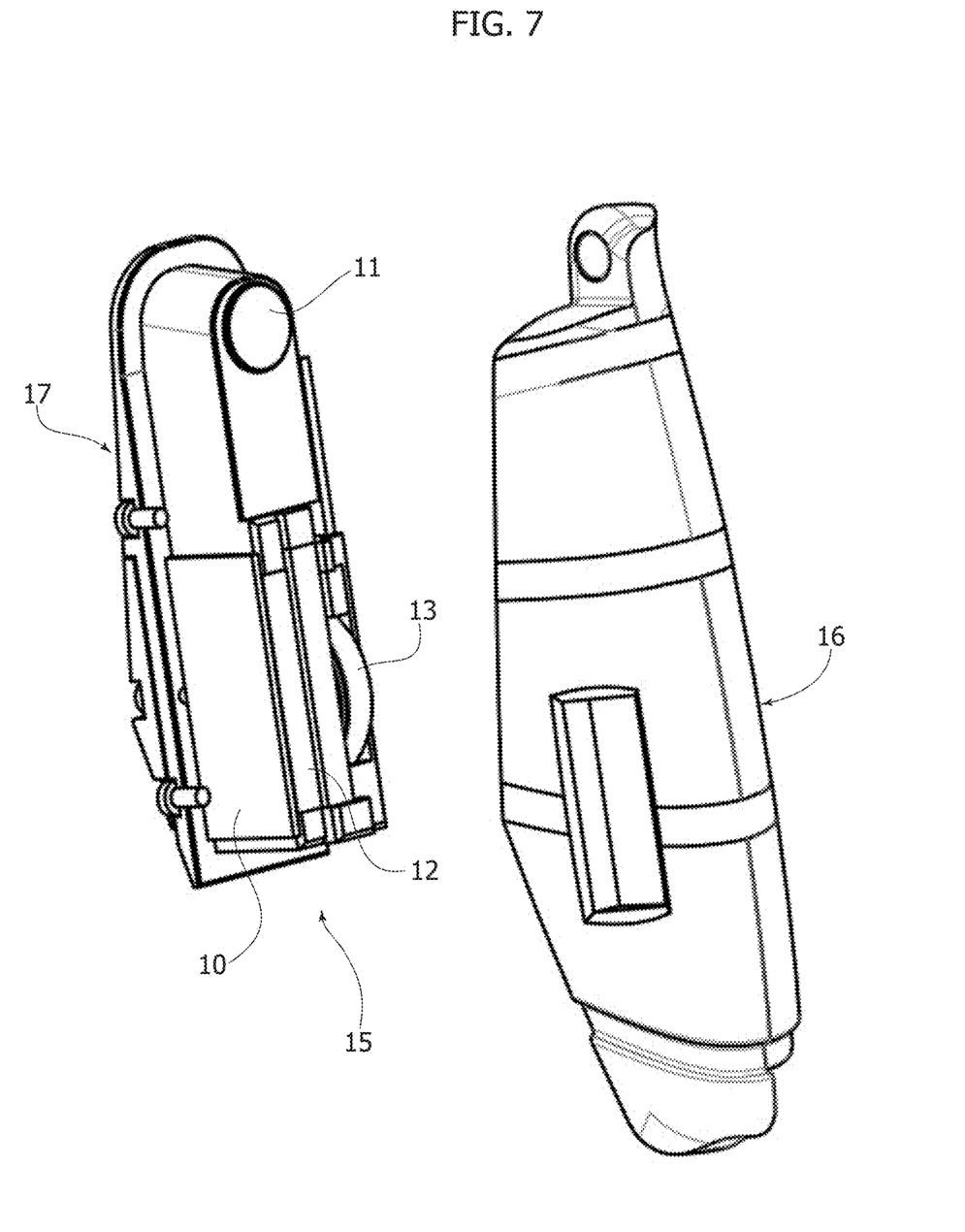
FIG. 7 is an exploded perspective view of the module of FIG. 6, seen from another angle.

In detail, such removable portion of the handle 2 consists in a module 15, better exemplified in FIGS. 6 and 7, formed by a metallic outer body 16, typically aluminium, like the body 1 and the handle 2 of the gun, and by an inner body 17, for example made of plastic material, housed in the outer body 16 and containing the transducer 11 with the relative electronic circuit 12, the display 10 and the battery 13 which, as indicated in FIG. 6, is in turn carried by a removable lid 18.

Figure 3:
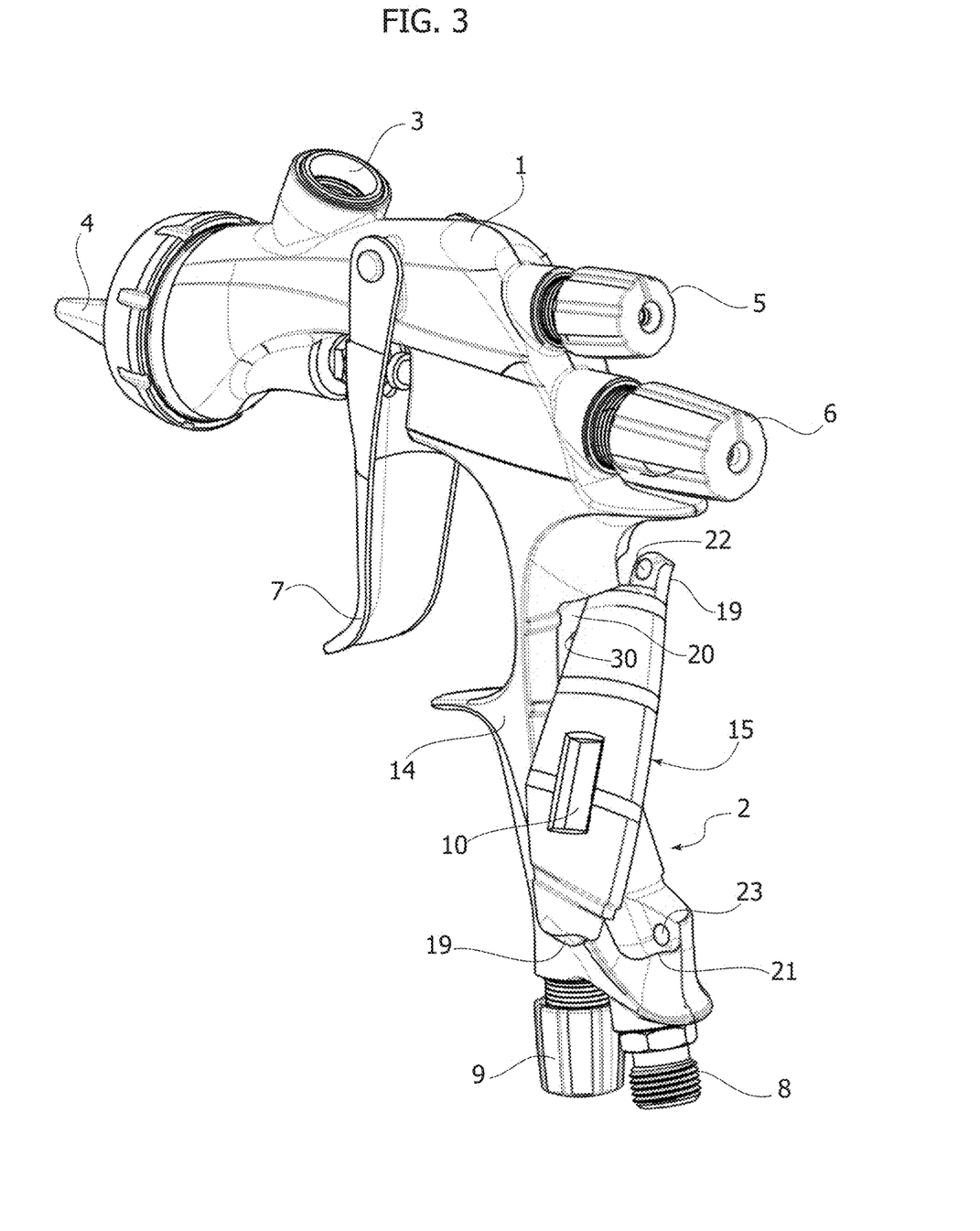
FIG. 3 is a view analogous to FIG. 1 which shows an intermediate step during the removal of the pressure gauge.
Figure 4:
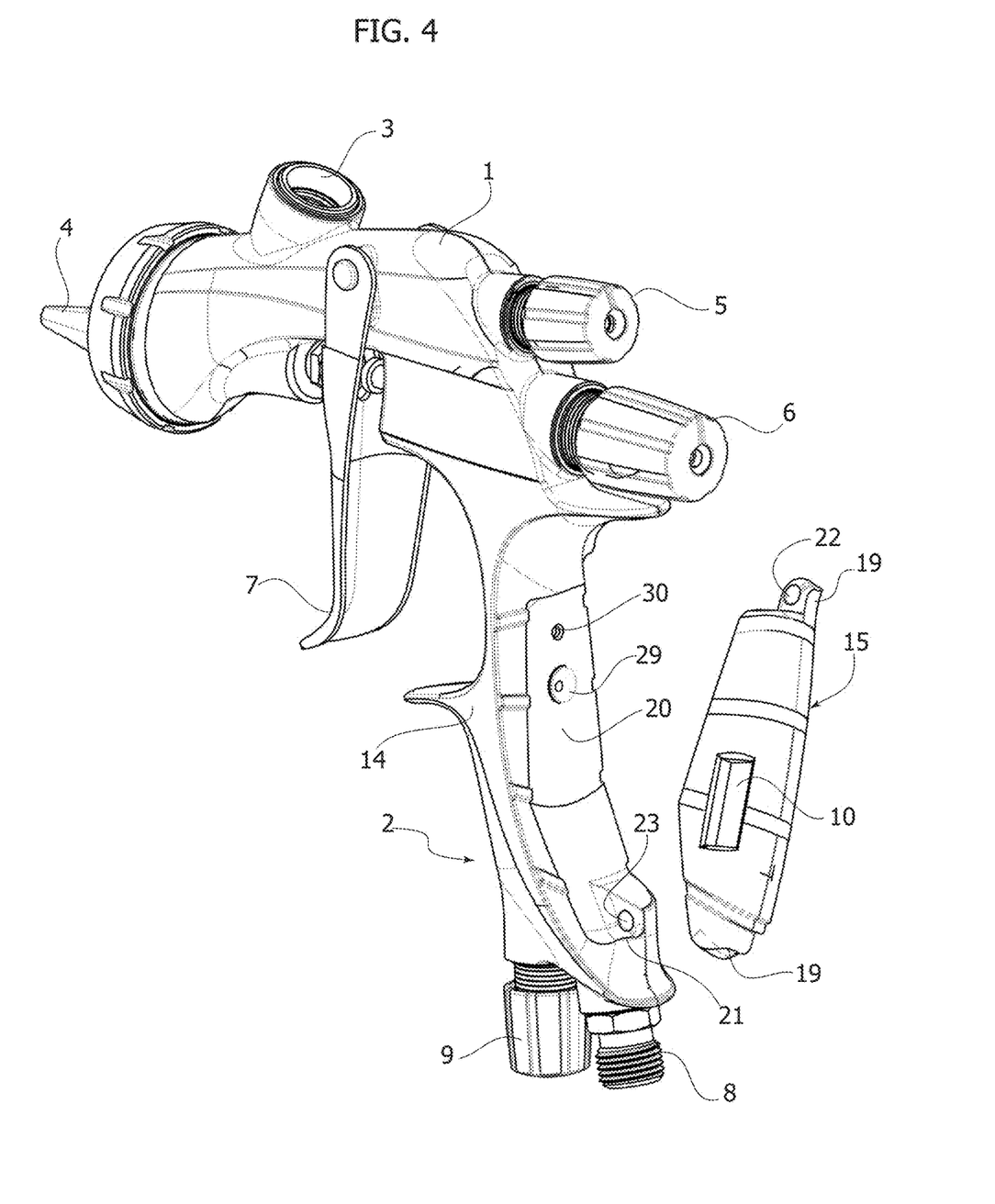
FIG. 4 is a view analogous to FIGS. 1 and 3 with the pressure gauge removed from the handle.

As mentioned, the module 15 is a substantial part of the dorsal area of the handgrip 14 and it is inserted in a manner such to enable rapid connection and disconnection at a recess 20 of the handgrip 2. The application and removal of the module 15 relatively to the recess 20 occur through an angular motion exemplified in FIG. 3. To this end, the outer body 16 of the module 15 is formed with a pair of end appendages 19 of which at least the lower one has a shaped surface that is complementary to that of an end surface 21 of the recess 20 to obtain a slightly forced coupling between the module 15 and the handle 2. Removing the pressure gauge requires rotating the module 15 by a few degrees as shown in the FIG. 3, so as to disengage the surfaces 19 and 21 and thus enable the removal of the module 15 from the recess 20, as shown in FIG. 4.

In the condition of the module 15 inserted into the handgrip 2, besides the mechanical restraint provided by the forced coupling surfaces 19 and 21, conveniently provided is an additional magnetic locking obtained through permanent magnets 22, 23 (FIG. 3) respectively carried by the appendages 19 of the outer body 16 and in the recess 20 of the handgrip 2.

According to the invention, also provided is a safety stop which hinders the removal of the module 15 in the presence of compressed air in the gun. Such safety stop consists in at least one locking pin 24, shown in FIGS. 6 and 9, carried by a plunger 25 (FIGS. 8 and 9) moveable in a chamber 26 (FIG. 9) of the inner body 17 of the module 15. The chamber 26 is placed in communication, through a passage 27 and an inlet 28 (FIGS. 8 and 9), with an outlet hole 29 (FIG. 4) of the handle 14 placed in communication with the compressed air inflow connector 8. When the module 15 is applied to the handle 2 (FIGS. 1 and 2) and the gun is supplied with compressed air, the locking pin 24 pushed by the plunger 25 is engaged in a hole 30 of the recess 20, placed in communication with the inflow connector 8. Thus, the rotation of the module 15 is hindered and can be carried out, as described previously, only in the absence of pressurised air in the gun.

Through the outlet hole 29, the transducer 11 directly measures the compressed air pressure supplied to the gun through the inflow connector 8, and the measured value is shown on the display 10.

In light of the above, it is clear that the spray painting gun according to the invention enables a comfortable and easy removal of the pressure gauge to enable the periodical washing of the gun using solvents, thus ensuring an equally easy re-installation of the pressure gauge. In the installed condition, the arrangement of the pressure gauge, or the module 15 that contains it, is such that the configuration of the handgrip 14 and the gun is not altered or modified in any manner whatsoever from a functional, ergonomic and aesthetic point of view. The removal of the module 15 from the handle, for example to enable washing the gun using solvents, does not jeopardise the operation thereof in that—as explained—the compressed air inflow connector 8 is integrally joined to the gun and thus independent from the removable portion thereof. Thus, the gun could operate even without such portion which could be replaced, for example, by a special insert.

In the embodiment described above, as mentioned, the digital pressure gauge 11-10 is entirely contained in the removable portion or module 15. Alternatively, and according to the variant which will be described now with reference to FIGS. 10-14 (in which parts identical or similar to those described previously are indicated using the same reference numbers) the digital pressure gauge can only be partly contained in the module 15.

More in particular, in this variant the digital pressure gauge consists of a pressure sensor conveniently of the piezoresistive type 30 housed in the handgrip 14 of the handle 2 and operatively associated to a pressure indicator or display 31 housed in the module 15, analogous to the one described with reference to the previous embodiment, and visible from outside the handle 2. The display 31 can be electrically connected with the pressure sensor 30, when the module 15 is applied to the handle 2, through a unit equipped with electrical connectors 32. As observable in FIG. 10, the pressure sensor 30 is directly faced to a duct 33 formed along the handle 2 and power-supplied by the compressed air inflow connector 8. When the module 15 is detached from the handle 2, the pressure sensor 30 can be in turn removed, if need be.

Obviously, the construction details and the embodiments may widely vary with respect to what has been described and illustrated, without departing from the scope of protection of the present invention as defined in the claims that follow.

The invention claimed is:

1. Manually-operated paint spray gun comprising:
a body having a nozzle for atomizing paint to be sprayed;
a handle forming a handgrip and having a connector for an inflow of compressed air to be supplied to said nozzle,
the handle comprising a compressed air regulator to which a digital pressure gauge is operatively connected; and
said handle comprising a removable portion forming a part of a dorsal area of said handgrip and a front portion, said removable portion separable from said front portion, said pressure gauge arranged in said removable portion of the handle;
said connector joined to a bottom part of said front portion of said handle on an opposite end of said handle relative to said body.

2. The spray gun according to claim 1, wherein said removable portion comprises a module configured to be connected and disconnected relative to said front portion of the handle by means of an angular motion.

3. The spray gun according to claim 2, further comprising a mechanical locking obtained by means of complementary forced-coupling surfaces between said module and said front portion of said handle associated to said angular motion.

4. The spray gun according to claim 3, further comprising a magnetic locking between said module and said handle associated to said angular motion.

5. The spray gun according to claim 3, further comprising a safety stop for said module relative to the handle, activated by the compressed air supplied to the gun through said inflow connector.

6. The spray gun according to claim 2, further comprising a magnetic locking between said module and said front portion of said handle associated to said angular motion.

7. The spray gun according to claim 6, further comprising a safety stop for said module relative to the handle, activated by the compressed air supplied to the gun through said inflow connector.

8. The spray gun according to claim 2, further comprising a safety stop for said module relative to said front portion of said handle, activated by the compressed air supplied to the gun through said connector.

9. The spray gun according to claim 8, wherein said stop comprises a sliding pin displaceable with respect to said module between an inoperative retracted position, in the absence of compressed air in the handle, and an operative extracted position, in the presence of compressed air in the handle, in which said sliding pin is engaged into a hole of said handle so as to hinder the angular motion of the module.

10. The spray gun according to claim 9, wherein said at least one sliding pin is carried by a plunger movable in a chamber placed in communication with said connector for the inflow of the compressed air into the applied condition of said module to the gun handle.

11. The spray gun according to claim 1, wherein the digital pressure gauge consists of a pressure transducer with an indicator entirely housed in said removable portion of the handle associated thereto.

12. The spray gun according to claim 1, wherein the digital pressure gauge comprises a piezoresistive pressure sensor housed in the handle and a pressure indicator housed in said removable portion of the handle and which can be electrically connected with said pressure sensor when said removable portion is applied to the handle.

* * * * *